United States Patent [19]

Iversen et al.

[11] 4,291,904

[45] Sep. 29, 1981

[54] FILTER HOLDER

[75] Inventors: Niels A. Iversen, Hadsund; Jørgen Pedersen, Mariager; Hans Lolk, Randers, all of Denmark

[73] Assignee: Arkay Packaging Corporation, New York, N.Y.

[21] Appl. No.: 121,882

[22] Filed: Feb. 15, 1980

Related U.S. Application Data

[63] Continuation of Ser. No. 953,894, Oct. 23, 1978, abandoned.

[30] Foreign Application Priority Data

Oct. 24, 1977 [DK] Denmark ............................. 4717/77

[51] Int. Cl.³ .......................... F16L 5/02; B01D 46/02
[52] U.S. Cl. ...................................... 285/162; 55/378; 55/502; 16/2
[58] Field of Search ................. 55/374, 377, 378, 379, 55/502, 507, 509; 277/198, 212 F; 285/162, 196, 338, DIG. 22; 16/2

[56] References Cited

U.S. PATENT DOCUMENTS

| 2,210,748 | 8/1940 | Bernstein | 277/212 F |
| 2,308,310 | 1/1943 | Ruemelin, Jr. et al. | 285/174 |
| 2,321,411 | 6/1943 | Morse | 277/212 F |
| 3,170,777 | 2/1965 | Held | 55/379 |
| 3,812,660 | 5/1974 | VandenHoeck | 55/378 |
| 4,007,026 | 2/1977 | Groh | 55/378 |
| 4,014,672 | 3/1977 | Jansson | 55/379 |

FOREIGN PATENT DOCUMENTS

| 2536568 | 2/1977 | Fed. Rep. of Germany | 55/379 |
| 966235 | 8/1964 | United Kingdom | 55/378 |
| 1297194 | 11/1972 | United Kingdom | 55/379 |
| 1331417 | 9/1973 | United Kingdom | |

Primary Examiner—David L. Lacey
Attorney, Agent, or Firm—Hopgood, Calimafde, Kalil, Blaustein & Judlowe

[57] ABSTRACT

The present invention relates to a filter bag holder comprising a flexible tubular member having a relatively constant outside diameter throughout a substantial portion of its length to one of its axial ends and having two axially spaced annular ribs protruding from the outside of the tubular member near its other axial end. The constant-diameter end may be attached to a filter bag, and the ribbed end engages in the region between the two axially spaced protruding annular ribs with a rim around an aperture in a partition located between mediums under different pressures.

3 Claims, 3 Drawing Figures

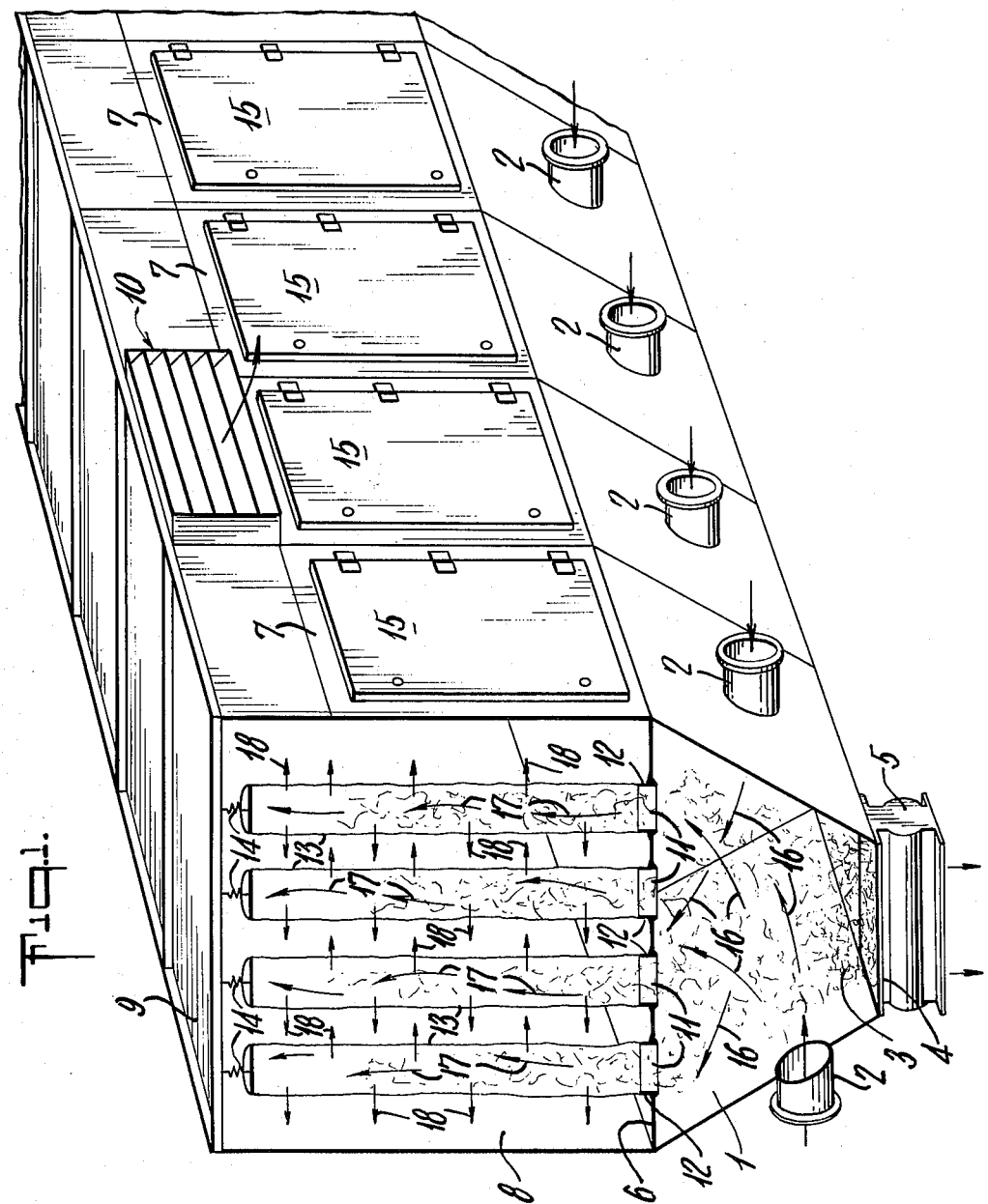

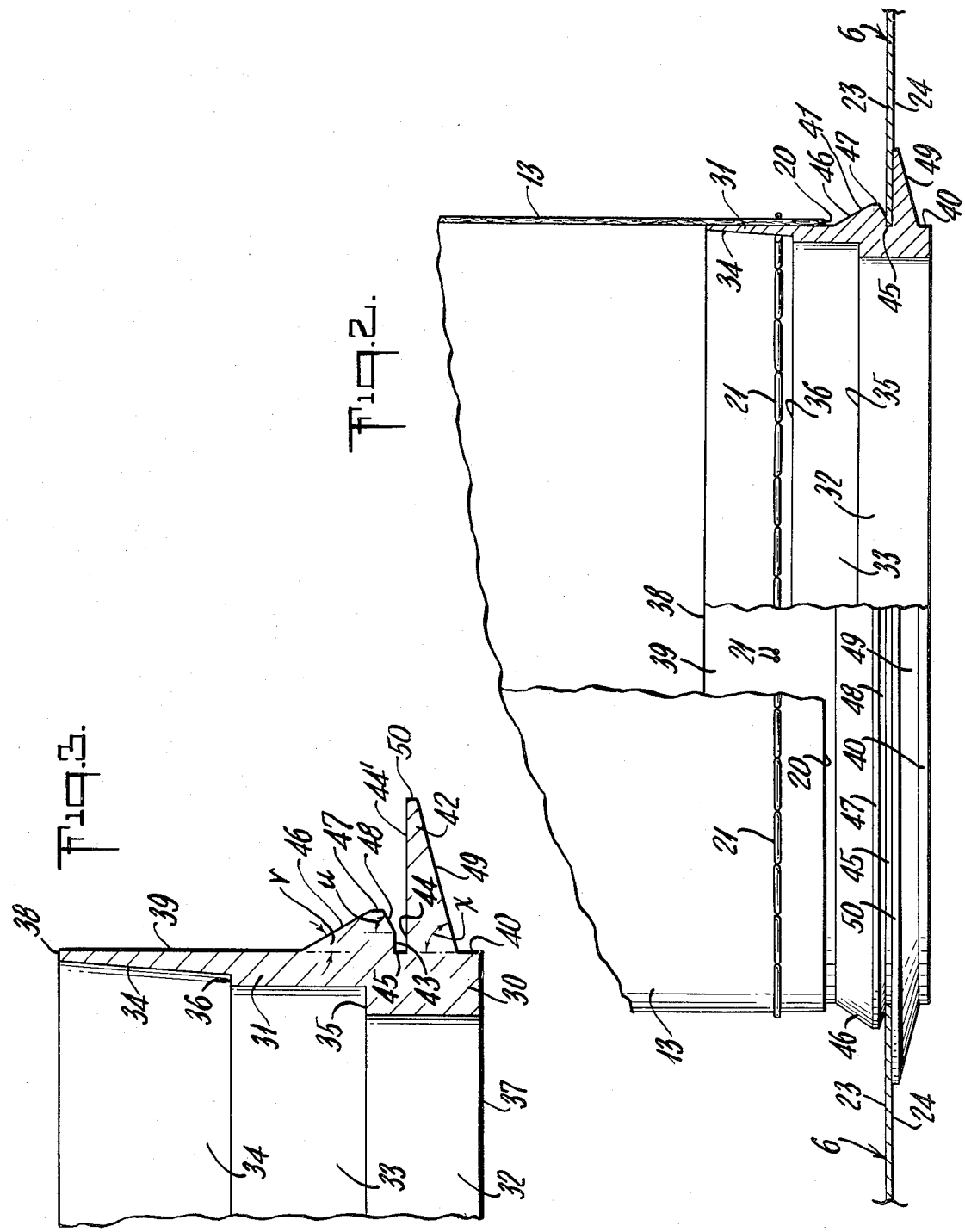

FILTER HOLDER

This is a continuation of Application Ser. No. 953,894, filed Oct. 23, 1978; said application now abandoned.

This invention relates to a filter holder for fastening a filter bag in an air filtering system for industrial purposes, and is of the kind which is designed as a ring shaped flexible holder on to which the filter bag is fastened. The present invention is constructed so that it can be fixed airtight to an opening in a partition in the filtering system.

Air filtering systems are increasingly required in many factories and they are used in many industries today. It is important that persons supervising and in charge of running air filtering systems are not subjected to unhealthy conditions when inspecting and maintaining the filtering system.

In most cases the cleaning process in this kind of air filtering systems is effected such that unfiltered air is introduced to a pressure chamber by means of pumps. These pumps constitute part of the cleaning system and since an excess pressure exists in said pressure chamber the air is able to move on from this pressure chamber through the filtering elements and into another chamber in which the excess pressure is not substantial. The excess pressure in the pressure chamber is generated due to the fact that the filtering elements render a certain resistance to the penetration of the air since the filtering elements are made of a material that can keep back dust and other large particles. Between the pressure chamber and the other chamber which surrounds the filtering elements and from which cleaned air exits an airtight partition is normally placed. This partition, which most often is placed horizontally, is provided with circular openings in which elements may be fastened airtight, said elements being fastened to the edge of filter bags or elements on to which the filter bags may be removable attached. From the chamber containing the cleaned air, i.e. the chamber surrounding the filter bags and above the partition, the cleaned air is led to the ambient atmosphere outside the factory; however, the cleaning system may be placed either within the halls of the factory or outside the factory building. The partition between the pressure chamber with the uncleaned air and the chamber above with cleaned air is advantageously placed horizontally. The reason is that the pressure in the lower chamber with uncleaned air will cause the bags, which are fastened airtight to the edge of the circular openings in the partition, to inflate and rise to a vertical position. Because the upper end of the filter bags are fastened to the ceiling of the chamber above the partition, during both operation, as well as when the system is stopped, separated material will fall from the filter bags down into the bottom of the pressure chamber, from where the material separated from the air is removed at certain time intervals. Filtering systems of this kind may, according to size and capacity, contain a varying number of filter bags. In larger systems there may be up to several hundred filter bags in a cleaning system. The diameter of the filter bags is often around 25 to 30 centimeters whereas the length of the filter bags may be around 2 meters.

Filtering systems of the above mentioned kind are known and contain filter bags which are removably mounted on couplings which are fixed airtight to suitable holes in the partition between the chambers and in such a way that the couplings protrude above the partition and into the chamber containing the cleaned air. When replacing a filter bag the procedure is to completely remove the filter bag which is to be replaced, from the coupling. In this regard the operator must pull the filter bag to be mounted around and then down on the coupling. Following this the fastening is executed and in case of systems with fixed couplings a clamping device adapted with some quick acting closure mechanism is tightened around the edge of the filter bag and the coupling so that the filter bag is clamped airtight against the outer surface of the coupling. It is understood that from the point of view of pollution control this method of replacing a filter is unfavorable since when a filter bag is removed a reduced pressure is momentarily generated in the underlying collecting chamber which previously had an excess pressure thereby causing large quantities of deposit, i.e. dust and larger particles to be whirled and thrown up through the coupling. The operator, therefore, is subjected to a cloud of dust which may be unhealthy, and greater amounts of dust than usual are driven through the coupling than under normal circumstances when the penetration capacity is a controlling factor and determines how much uncleaned air is passing through the coupling. The time used for replacement is extended further because of the dust inconvenience. A further disadvantage inherent in this design for fastening the filter bags is that the manufacturing costs for the cleaning system is increased because of the costs involved in making the couplings and mounting them in the partition. Another known way of fastening the filter bags in filtering systems working according to the same principles is to fasten the filter bags in the holes of the partition without using fixed couplings. In this method each filter bag is fastened at the edge to a flexible ring-shaped holding element, a so-called collar, the size of which fits circular springs positioned in the partition. The collar has on its outer surface a groove all the way round, said groove being shaped so that it fits around the edge of the circular opening in the partition and cooperates with the circular spring to hold the collar in place. When the collar, after being bent, is placed into the cut-out in the partition and held in the correct position and at the same time allowed to unbend the collar clamps the filter bag during operation and fits airtight against the edge of the circular cut-out in the partition. A filter collar of this kind is shown in registered design No. 499-77. The collar or filter ring holder is made of a flexible but nevertheless relatively rigid element having two external reinforcements between which the ring shaped groove in the external surface for fastening the bags is found. The circular surface which constitutes the bottom of the circular groove and is shaped like a cylinder, has a diameter equal to the diameter of the circular cut-out in the partition, and a width equal to the thickness of the partition. In this way said reinforcements hold the filter bag and ensure a tight fit against the edge of the circular cut-out in the partition. The collar is injected molded of a rubber-like or elastic material and during the manufacturing process a piece of filter fabric is cast into the collar situated so that is is perpendicular to a plane passing through the ring shaped reinforcement. In this way a filter bag may be sewn on to said filter fabric. The collar, therefore, has the disadvantage that during the molding process filter fabric must be placed in the mold which means increased costs of the manufacturing process. It is furthermore a disadvantage that the filter bag cannot be fastened directly to the molded material of the collar. The possibilities of filtering can, therefore, not be determined independent of the filter collar. Another disadvantage when using this filter collar is that the mounting of the filter bag in the circular opening of the partition is relatively difficult. Mounting is difficult because when mounting it is necessary to fold the collar together or at least to bend it inward so that its radial dimension, is so small that one reinforcement can pass through the circular cut-out in the partition; moreover, at the same time the operator must ensure, when he is straightening out the collar, that the ring shaped reinforcement on the external surface of the collar successively catches the inner edge of the circular opening in the partition. The mounting of this collar, however, will always take a relatively long time and the operator will therefore be subjected to the above mentioned disadvantages, because dust and other often unhealthy dirt will blow through the opening in the partition during the mounting procedure. Because of these unhealthy disadvantages it will be difficult in many cases to exchange the filter bags while the filtering system is working, similarly larger filtering systems, with several hundred filter bags, will be difficult to stop when changing one or several filter bags.

Another known holding element for a filter bag is shown in British Pat. No. 1,331,417. The holding described in this patent is made of homogeneous material without cast-ins of material having a different structure and the holder is designed so that it has two flanges or reinforcements that are almost identical but so flexible and movable relative to each other so that the holder can be mounted either by putting the lower reinforcement through the mounting opening in the partition, which acts as a holding plate, or the mounting can be carried out by first moving the upper flange or reinforcement, to which the edge of the filter bag is fastened, through the holding plate, i.e., past the edge of the mounting opening. In both cases the holder is to be mounted manually by holding directly on the holder itself which is edged in place, which has the disadvantage that the mounting itself takes a relatively long time and that the person who carries out the mounting while the cleaning system is operating, is subjected to inconveniences from the dust. This known holder is also designed so that it is not very rigid and because the external groove, which is to grip on to the edge of the mounting opening to fix the holder to the mounting plate, furthermore is shaped in a V-form which has a consequence that the design does not exhibit a safe connection between bag holder and holding plate. When manually cleaning the filter bag, while the cleaning system is in operation, the bag holder may be pulled out of the filter bag because manual cleaning is carried out by loosening the closed end part of the filter bag with its spreading frame from its point of fastening and then by performing a number of consecutive heavy pulls upward in the frame stretches out the filter bag. When cleaning the filter bag by blowing air through, during which procedure conditions in the cleaning system are made so that cleaned air is directed the opposite way through the texture of the filter bag—i.e., from the outside of the bag and into the filter bag itself—it is not possible for this known bag holder to remain in the holding plate. When said lastmentioned cleaning method, where the closed end of the filter bag is still suspended, is utilized a higher air pressure is generated outside the filter bag as compared with the internal air pressure of the filter bag, with the result that the filter bag is subjected to forces which try to press the bag together along its longitudinal middle axis and consequently the known holder may be pulled out of the mesh with the edge of the mounting opening.

It is the aim of the present invention to disclose a holder for a filter bag having none of the above mentioned disadvantages. According to the invention this is accomplished by designing a holding element of the type described in the introduction and depicted in the drawings. A further advantage is that the operator is able to exchange the filter bag in such a way that only a small opening appears in the circular cut-out of the partition where the exchange takes place. The result is the beneficial effect that during exchange only very small amounts of injurious and annoying dust are pressed up into the chamber above the partition. The design of the filter holder according to the invention makes possible to bend the filter holder, which is to be exchanged, away from the edge of the circular opening in the partition along a small part of the periphery and in the opening thus created the operator can at once insert the bended filter holder which is fastened to the filter bag to be mounted. The filter holder is at once pressed down into the chamber situated below the partition thereby hanging in the filter bag. The operator then only has to remove the filter bag which is to be exchanged and at the same time pull a little on the filter bag to be mounted. This will cause the lower part of the filter bag to which the filter holder is attached to automatically stop air from passing through the mounting opening in the partition. Because of the advantageous design of the filter holder the operator just pulls the filter bag without being exposed to dust and the bag automatically seeks its position because the lower part of the filter holder beneath the ring shaped groove will itself constitute a stop against that part of the under surface of the partition which borders on the circular opening of the partition. A further advantage of said filter holder is that it is not necessary to mold filter fabric into the holder thereby making manufacturing costs less expensive. Another advantage of the design according to the invention is that because of the internal diameter of the upper part of the groove of the filter holder being a little larger than the internal diameter in the vicinity of the holding elements themselves, i.e. the groove, the material by means of which the filter bag is sewn on to the filter holder is protected.

It is understood that the described design according to the invention results in a number of advantageous technical improvements. As a result a self-centering quickclosing filter holder is obtained which itself will seek a position in the mounting opening just by pulling the filter bag which thereupon seals tightly against the partition at the edge of the mounting opening. Another result is that the filter holder is inexpensive to manufacture.

The invention is described in more detail by referring to the drawings, where

FIG. 1 is a schematic perspective view of an air filtering system, which is shown cut-through in a transverse, vertical direction but not showing the elements for moving the air, FIG. 2 is a side view of the filter bag according to the invention, also showing part of the sewn-on filter bag where the one half of the filter holder on the sewn-on filter bag is shown with a diametrically sectioned view, and FIG. 3 shows in more detail and larger scale a diametral section view of the filter holder of FIG. 2.

In FIG. 1 is shown a portion of a filtering unit consisting of a pressure chamber 1 which is fitted with one or several adjusting collars 2 which are connected to tubes leading to a ventilator, the tubes and ventilator not being shown in the drawing. The pressure chamber 1 is conically shaped with the smaller diameter part pointing down so that the filtered-off material 3 is collected on the bottom 4 of the pressure chamber 1. Beneath the pressure chamber 1 is fastened a sluice 5 through which the collected, filtered-off material 3 is emptied. The pressure chamber 1 is on its top provided with a plane horizontal partition 6. The partition 6 is along its edge airtight secured to the upper edge of the pressure chamber 1. The partition 6 separates the pressure chamber 1 from another pressure chamber 8 which is built on top of the prssure chamber 1 and the partitions of said chamber 8 are designated 7. The chamber 8 has on its top a horizontally placed ceiling plate 9. The partition 7 has on its upper part slots 10 through which the cleaned air leaves chamber 8. The partition 6 has a number of circular openings 11 only, four of which are shown in FIG. 1. In each of the openings 11 is mounted a removable, airtight holding element 12. Each of the holding elements 12 is secured to a filter bag 13. At the upper closed end of each of the filter bags holding elements 14 are fastened. These holding elements are designed to act as spring elements which clamp the closed ends of the filter bags to carrying elements in the ceiling plate 9 so that the filter bags take on a vertical position even when the filtering system is not working. In the system depicted chamber 8 is large enough that a person, say the operator, may walk around within it in a raised position, and access doors 15 are located in partition 7. When the filtering system is working uncleaned air is forced through the tube collars 2 thereby creating positive pressure in chamber 1. The uncleaned air is then placed through the chamber 1 as indicated by arrows 16. The uncleaned air moves up through the filter bag 13, as shown by arrows 17 and penetrates through them as shown by arrows 18. Dust and dirt are separated by the filter natural so that a continuous supply of cleaned air is introduced to the chamber 8. From chamber 8 cleaned air is led through the slots 10.

FIGS. 2 and 3 depict location and position of the filter holder 12 and the filter bag 13 in the filtering system, and in FIG. 2 the filter holder is shown fastened to the partition 6 the side surfaces of which are designated 23 and 24. The edge 20 of the filter bag 13 is sewn-on to the filter holder 12. The stitching is designated 21. The filter holder 12 is shaped so that at its lower part it is a massive ring with rectangular cross section 30 and the upper part of filter holder 12 has a tapered cross section 31. The inner surface of the bottom of filter holder 12 is shaped like a cylinder 32, in the middle the filter holder 12 is shaped like another cylinder 33 having a slightly larger inner diameter than that of cylinder 33, and on top of the holder the inner surface is shaped like a conical frustrum of cone 34 becoming narrower as it extends upwards. Between the cylinder surfaces 32 and 33 a recess is made on the inner surface of the filter holder 12 so that the upper edge of cylinder surface 32 and the lower edge of cylinder 33 both are adjacent to an interadjacent, ring-shaped radial surface 35. There is also a recess between the cylinder surface 33 and the frustrum-of-cone surface 34 so that the lower edge of the conical surface 34, the lower smallest diameter of which is a little larger than the diameter of the cylinder surface 33, and the upper edge of the cylinder surface 33 both are adjacent to a plane, small, ineradjacent ring-shaped radial surface 36. The lower surface 37 of the filter holder 12 is a radial surface and the filter holder 12 has on its top a small ring-shaped radial plane surface 38. The outer diameter of surface 38 is approximately equal to the outer diameter of the lower surface 37. The external surface of the filter holder 12 is such that its top is shaped like a cylinder 39, the height of which is approximately half the total height of the bag holder and at the bottom the external surface is a cylinder 40, the height of which is relatively small. It is understood that the cylinder surfaces 39 and 40 have approximately equal diameters. On the outside of the holder between the two cylinders 39 and 40 the filter holder 12 is provided with a reinforcement 41 and a conical part 42 whose cross-section becomes narrower as its diameter increases from the lower and relatively rigid part of the filter holder 12. Between the reinforcement 41 and the part 42 a circular groove is placed having radial parallel radial surfaces 43 and 44 and a cylinder shaped bottom surface 45. The reinforcement 41 has on its top an inclined surface 46 which constitutes a frustrum of cone which becomes narrower as it extends upwards so that half its angle v is approximately 30°. On its largest diameter the reinforcement 41 is limited by a small cylindrical surface 47 and between 47 and the upper side surface 43 of the ring groove the reinforcement 41 is limited by another relatively small frustrum-of-cone surface 48 that tapers downward with an angle half of which is approximately 60° which is shown on the drawing in that a generator subtends an angle u with a vertical so that u is approximatley 60°. The protruding conical part 42 is shaped so that its upper surface 44' is a ring-shaped plane radial surface and a continuation of the lower side surface 44 of the ring groove, and its lower surface 49 is shaped like a frustrum of cone adjacent the cylinder-shaped surface 40 and its tapering is in a downward direction so that half its cone angle is approximately 75° which is shown on the drawing in that a generator subtends an angle x with a vertical so that x is approximately equal to 75°. The protruding conical part 42 is limited at its largest diameter by a small cylindrical surface 50.

When the filter holder 12 with a filter bag 13 attached is to be mounted the operator, who is in chamber 8 above the partition 6, bends the filter holder together and inserts it down through the circular cut-out 11 and then just pulls the filter bag upwards until the lower protruding part 42 of the filter holder automatically prevents the filter bag from being moved further upward. This is the case when the plane upper surface 44' of the part 42 hits the under surface 24 of the partition 6. If an exchange is to be made the filter holder to be exchanged is not removed, rather it is just bent toward the center along a small part of the circumference and through the opening thus made the folded filter holder which is to be mounted is moved down into the dust filled chamber 1 whereupon it immediately straightens itself out and in this way hangs on the filter bag to which it is attached. Thereupon the filter holder which is to be exchanged is removed, and because the filter holder to be mounted is hanging close to the partition the excess pressure in the dust filled chamber will immediately press it up against the partition and because air with excess pressure is led into the filter bag to which it is fastened the result is that the upper thin elastic part of the filter holder often automatically will move up into the mounting opening so that the operator must simply pull the filter bag upwards and the mounting is completed. The reason why this easy and safe mounting method is possible is due to the fact that the advantageous design of the filter holder causes the following to happen: the upper thin flexible part 31 with the attached filter bag edge 20 is easy to pull through the mounting opening in the partition 6. When slightly greater force is exerted upwards on the filter bag the reinforcement 41 is pulled through the circular opening 11. When the small surface 47 adjacent to the reinforcement 41 has passed the edge of the mounting opening the conical surface 48 will allow the filter holder to start to straighten itself out and at the same time the surface 48 will guide the filter holder so that the edge of the circular mounting opening 11 is automatically guided to the ring groove. The part 42 below the ring groove acts as a stop for the upward motion and prevents the filter holder from being pulled through the mounting opening. The part 42 is able to execute this function partly due to its large width, i.e. its outer diameter is much larger than the largest diameter of the reinforcement and partly because its cross sectional shape makes it stiff against a downward bending. The plane upper surface 44' which is in the same plane as the lower side surface 44 of the ring groove also acts automatically as a seal or stuffing surface against surface 24 at the edge of the mounting opening. It is understood that the filter holder according to the invention has the substantial advantage that it is mounted by simply inserting the filter holder through the mounting opening and then pulling up on the filter bag. It should be noticed that the surface 40 and 35 are intended to make the molding of the filter holder easier and as a consequence cheaper because the rim 40 acts as a stopping element when the molding parts that shape the ring groove are withdrawn in axial direction from the molded piece.

A number of advantages is obtained through the application of the invention: fast and easy mounting, the filter holder is easy to demount, the filter holder fits airtight in the partition where it is to hold the filter bag, the bag holder is easy to attach to the filter bag by stitching or gluing, the filter holder gives protection against wear of the material used for sew-on, and is cheap to manufacture by means of molding.

We claim:

1. An improved holder for use in conjunction with a filter bag, said holder providing for the removable mounting of said bag to a circular opening of a partition plate having plane-parallel opposed surfaces at the mounting opening, said holder being a single ring of flexible material with a skirt portion at one end adapted for circumferential assembly to an open end of the filter bag, said holder having a radially outward circumferential groove near its other end for engaged retention at the mounting opening of the partition plate, said groove having first and second plane parallel opposed sidewall regions and a cylindrical shaped bottom surface between said first and second sidewall regions, wherein the improvement comprises said skirt portion having an outer surface of substantially constant diameter for telescoped reception of the open end of the filter bag along said outer surface for secured assembly thereto, and in which the bottom surface of the groove is of substantially the same diameter as the outer surface of said skirt portion, there being a first retaining rib formation located between said skirt portion and said groove which is formed with said first sidewall region and a second mounting flange rib formation located between said groove and the end of the holder distal to the skirt portion, said second mounting flange rib being formed with the second sidewall region of said groove wherein said second mounting flange rib is a ring-shaped plane radial protrusion having a flat upper surface which is an extension of said second sidewall region, said flat upper surface being adapted to contact one of said plane-parallel opposed surfaces of said partition plate to seal the holder to said plate.

2. The bag holder of claim 1 in which the first retaining rib formation has a generally conical surface sloping toward the skirt portion of said holder and wherein said conical sloping surface is a unitary extension of said skirt portion, thereby allowing an assembled bag and holder to be readily fitted to the mounting opening by a snap fit at the groove.

3. The bag holder of claim 1 in which the thickness of said skirt portion tapers to a minimum at the end distal to said other end, the tapering region of said skirt portion being sufficiently axially extensive and thin to be adapted for sewn attachment of a bag end that is telescoped thereover.

* * * * *

UNITED STATES PATENT AND TRADEMARK OFFICE
CERTIFICATE OF CORRECTION

PATENT NO. : 4,291,904
DATED : September 29, 1981
INVENTOR(S) : Niels A. Iversen, Hadsund; Jorgen Pedersen, Mariager; Hans Lolk, Randers, all of Denmark It is certified that error appears in the above—identified patent and that said Letters Patent is hereby corrected as shown below:

On the Title Page, Item [73] should read:
Assignee: NORDISK PLADERORSFABRIK A/S, Assens, Denmark.

Signed and Sealed this

Twenty-ninth Day of December 1981

[SEAL]

Attest:

GERALD J. MOSSINGHOFF

Attesting Officer

Commissioner of Patents and Trademarks